(12) United States Patent
Coussieu et al.

(10) Patent No.: US 8,572,402 B2
(45) Date of Patent: Oct. 29, 2013

(54) METHOD AND DEVICE FOR DETECTING AN ATTEMPT TO SUBSTITUTE AN ORIGINAL CASING PORTION OF AN ELECTRONIC SYSTEM WITH A REPLACEMENT CASING PORTION

(75) Inventors: Alain Coussieu, Flaviac (FR); Alain Eck, Montmeyran (FR)

(73) Assignee: Ingenico France, Neuilly sur Seine (FR)

( * ) Notice: Subject to any disclaimer, the term of this patent is extended or adjusted under 35 U.S.C. 154(b) by 452 days.

(21) Appl. No.: 12/601,704

(22) PCT Filed: May 22, 2008

(86) PCT No.: PCT/FR2008/050883
§ 371 (c)(1),
(2), (4) Date: Jan. 20, 2010

(87) PCT Pub. No.: WO2008/145942
PCT Pub. Date: Dec. 4, 2008

(65) Prior Publication Data
US 2010/0180122 A1     Jul. 15, 2010

(30) Foreign Application Priority Data
May 24, 2007  (FR) ...................................... 07 55232

(51) Int. Cl.
*H04L 9/32*    (2006.01)
(52) U.S. Cl.
USPC .......................................... 713/189; 713/193
(58) Field of Classification Search
USPC .............. 713/176, 168–170, 189–194; 726/2, 726/26–30; 380/277–278, 46
See application file for complete search history.

(56) References Cited

U.S. PATENT DOCUMENTS

| | | | |
|---|---|---|---|
| 5,745,576 A | | 4/1998 | Abraham |
| 6,065,679 A | * | 5/2000 | Levie et al. ............... 235/462.47 |
| 8,009,032 B2 | * | 8/2011 | Long et al. .................... 340/500 |
| 2004/0003232 A1 | | 1/2004 | Levenson |
| 2004/0172536 A1 | * | 9/2004 | Malville et al. ............... 713/169 |
| 2005/0245235 A1 | * | 11/2005 | Vesuna ......................... 455/411 |
| 2006/0195705 A1 | | 8/2006 | Ehrensvard |
| 2006/0265752 A1 | * | 11/2006 | Wei et al. ......................... 726/26 |
| 2007/0271596 A1 | * | 11/2007 | Boubion et al. .................. 726/3 |
| 2008/0289003 A1 | * | 11/2008 | Bertin et al. ...................... 726/2 |

FOREIGN PATENT DOCUMENTS

GB    2411756 A    9/2005
JP    2001291050 A    10/2001

OTHER PUBLICATIONS

Written Opinion issued in PCT/FR2008/050883.
Search Report issued in PCT/FR2008/050883 on Dec. 16, 2008.

* cited by examiner

*Primary Examiner* — Hosuk Song
(74) *Attorney, Agent, or Firm* — Vedder Price PC

(57) ABSTRACT

The invention relates to an electronic system comprising a casing consisting of at least first and second casing portions and containing a device for detecting the substitution of the first casing portion. The device comprises a first integrated circuit intended to be fixed to the first casing portion and a second integrated circuit intended to be fixed to the second casing portion. The second circuit is adapted to transmit to the first integrated circuit successive random or pseudo-random digital signals (R). The first integrated circuit is adapted to return to the second integrated circuit, for each digital signal, the first encrypted signature (S) from said digital signal. The second integrated circuit is adapted to determine a second encrypted signature (S') from said digital signal and to detect a substitution of the first casing portion if the first and second encrypted signatures are different.

9 Claims, 1 Drawing Sheet

METHOD AND DEVICE FOR DETECTING AN ATTEMPT TO SUBSTITUTE AN ORIGINAL CASING PORTION OF AN ELECTRONIC SYSTEM WITH A REPLACEMENT CASING PORTION

FIELD OF THE INVENTION

The present invention relates to a device and a method for detecting an attempt to substitute a replacement package portion for a portion of an original package of an electronic system.

DISCUSSION OF PRIOR ART

For many electronic systems, it is desirable to prevent an unauthorized third party from accessing to the internal components of the electronic circuit and/or to the data exchanged by the internal components of the electronic system. For this purpose, safety devices enabling to detect an attempt of unauthorized access to the electronic system may be provided.

Such is the case, for example, for a card reader, in particular a bank card reader, used to perform payment operations. The card reader is generally formed of a package comprising at least a lower package portion connected to an upper package portion. The package contains a printed circuit to which the electronic components of the reader are connected.

The reader may comprise an integrated circuit, called cryptoprocessor, dedicated to the processing of critical data, for example, the personal identification numbers of the cards introduced into the reader. It is desirable to prevent for an unauthorized third party to have access to such critical data. For this purpose, the cryptoprocessor may also be dedicated to the detection of attempts of unauthorized access to the reader. It then receives alarm signals provided by safety devices equipping the reader. An example of a safety device corresponds to a circuit comprising a lattice-shaped conductive track. An interruption of the conductive track is considered as being representative of an attempt of unauthorized access to the reader and causes the delivery of an alarm signal to the cryptoprocessor. Another example of a safety device corresponds to a dummy key provided at the keyboard level. In normal operation, the key permanently ensures the electric connection between two conductive tracks of the printed circuit. An interruption of the electric connection is considered as being representative of an attempt of unauthorized access to the reader and causes the delivery of an alarm signal to the cryptoprocessor. When the cryptoprocessor detects that an unauthorized access attempt has occurred, it interrupts the normal operation of the reader and, in particular, deletes the critical data.

However, the sole detection of unauthorized access attempts may be insufficient to ensure an acceptable protection of the critical data. Indeed, a specific type of fraud which would comprise, by temporarily neutralizing the safety devices, replacing the original upper package portion with an upper package portion which would have been previously modified to be easily removable afterwards without causing the detection of an unauthorized access attempt by the cryptoprocessor, could be imagined. Thereby, a user unaware of the performed modification could then use the reader and give his personal identification number. The personal identification number could then easily be recovered by a third party, by removal of the modified package portion.

It is thus desirable, in addition to the detection of unauthorized access attempts, for the cryptoprocessor to permanently verify that at least some parts forming the reader do correspond to the original parts.

SUMMARY OF THE INVENTION

The present invention aims at a method and a device for detecting an attempt of unauthorized substitution of a replacement part for an original part of an electronic system.

According to another object, the detection device only slightly modifies the electronic system at the level of which it is provided.

Thus, an embodiment of the present invention provides an electronic system comprising a package formed of at least one first package portion connected to a second package portion and containing a device for detecting the substitution of the first package portion. The device comprises a first integrated circuit intended to be attached to the first package portion; and a second integrated circuit intended to be attached to the second package portion and capable of transmitting to the first integrated circuit successive random or pseudo-random digital signals, the first integrated circuit being capable of sending back to the second integrated circuit, for each digital signal, a first signature encrypted based on said digital signal, the second integrated circuit being capable of determining a second signature encrypted based on said digital signal and of detecting a substitution of the first package portion if the first and second encrypted signatures are different.

According to an embodiment, the first integrated circuit comprises a first memory in which are stored an identification number and a first key and the second integrated circuit comprises a second memory in which is stored a second key, the first integrated circuit being capable of transmitting the identification number to the second integrated circuit, the second integrated circuit being capable of transmitting the identification number to an activation tool external to the reader and of receiving the second key, equal to the first key, determined by the activation tool by a first encryption function based on the identification number and on a third key, the first integrated circuit being capable of determining, for each digital signal, the first signature encrypted by a second encryption function based on said digital signal and on the first key, the second integrated circuit being capable of determining the second signature encrypted by the second encryption function based on said digital signal and on the second key.

According to an embodiment, the first integrated circuit is connected to the second integrated circuit by a wire link.

According to an embodiment, the first integrated circuit is connected to the second integrated circuit by a capacitive link.

According to an embodiment, the system corresponds to a card reader, especially for performing payment operations.

The present invention also provides a method for detecting the substitution of a first package portion of a system, further comprising a second package portion connected to the first package portion. The method comprises providing a first integrated circuit attached to the first package portion and a second integrated circuit attached to the second package portion; having the second integrated circuit transmit to the first integrated circuit successive random or pseudo-random signals; having the first integrated circuit send back to the second integrated circuit, for each digital signal, a first signature encrypted based on said digital signal; and having the second integrated circuit determine a second signature encrypted based on said digital signal and detect a substitution of the first package portion if the first and second encrypted signatures are different.

According to an embodiment, the method comprises the steps of:

a) storing in the first integrated circuit an identification number and a first key which is not accessible from the outside of the first integrated circuit;

b) having, in the activation phase, the second integrated circuit transmit the identification number to the second integrated circuit;

c) having, in the activation phase, the second integrated circuit transmit the identification number to an activation tool external to the reader;

d) having, in the activation phase, the activation tool determine a second key, equal to the first key, by a first encryption function based on the identification number and on a third key;

e) having, in the activation phase, the activation tool transmit the second key to the second integrated circuit;

f) having, in a normal operating phase, the second integrated circuit transmit to the first integrated circuit the successive random or pseudo-random digital signals;

g) having, in the normal operating phase, the first integrated circuit send back to the second integrated circuit, for each digital signal, the first encrypted signature determined by a second encryption function based on said digital signal and on the first key; and h) having, in the normal operating phase, the second integrated circuit determine the second signature by the second encryption function based on said digital signal and on the second key, and detect a substitution of the first package portion if the first and second encrypted signatures are different.

According to an embodiment, the method further comprises the step of having the second integrated circuit delete the second key in the case where the first and second encrypted signatures are different at step h), the reusing of the reader then requiring a new implementation of steps b) to e).

According to an embodiment, the first encryption function is a function of DES or Triple DES type and/or the second encryption function is a function of SHA type.

BRIEF DESCRIPTION OF THE DRAWINGS

The foregoing objects, features, and advantages of the present invention, as well as others, will be discussed in detail in the following non-limiting description of specific embodiments in connection with the accompanying drawings, among which.

DETAILED DESCRIPTION

Figure 1:
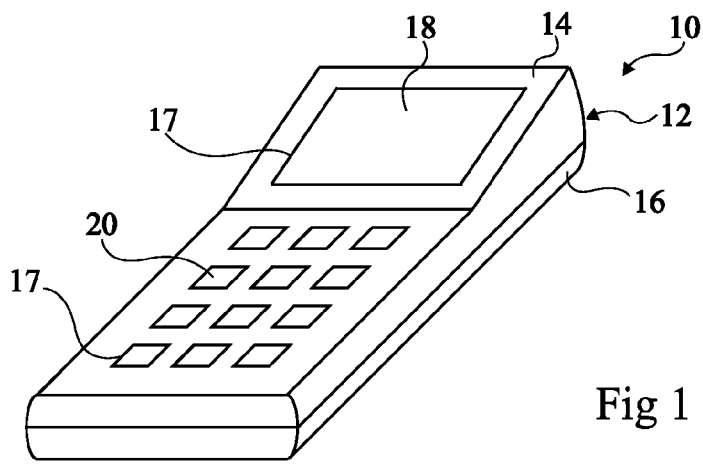
FIG. 1 is a simplified perspective view of an example of a card reader.

For clarity, the same elements have been designated with the same reference numerals in the different drawings.

The present invention will now be described for a reader, for example, a card reader, used, for example, to perform payment operations. It should however be clear that the present invention may apply to any electronic system for which it is desirable for an attempt of unauthorized substitution of a replacement package for an original package portion of the electronic system to be detected.

FIG. 1 schematically shows an embodiment of a card reader 10. Reader 10 comprises a package 12 formed of an upper package portion 14 and of a lower package portion 16. Openings 17 are provided at the level of upper package portion 14 for a display screen 18 and keys of a keyboard 20. Further, an opening, not shown, is provided in package 12 to enable to introduce cards.

Figure 2:
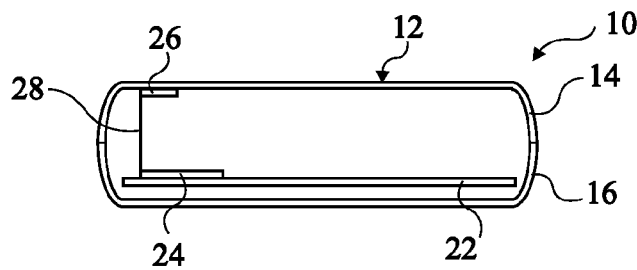
FIG. 2 is a simplified cross-section of the reader of FIG. 1 and shows an example of a device for detecting an attempt of unauthorized substitution of a portion of the reader package.

FIG. 2 is a simplified cross-section of reader 10 of FIG. 1. Package 12 contains a printed circuit 22, called motherboard, attached to lower package portion 16 and to which are connected the electronic components of reader 10. In particular, an integrated circuit 24, called cryptoprocessor, is connected to motherboard 22 and is dedicated to the handling of critical data used by reader 10. As an example, the critical data may correspond to keys used in encryption operations implemented by cryptoprocessor 24. These may also be personal identification numbers of the cards used with reader 10.

Cryptoprocessor 24 is also dedicated to the detection of attempts of unauthorized access to reader 10. For this purpose, cryptoprocessor 24 is connected to safety devices, not shown, capable of delivering alarm signals to cryptoprocessor 24 on occurrence of an unauthorized access attempt. The safety devices may comprise lattice-type safety circuits and/or dummy keyboard keys or any other devices for detecting intrusion attempts. In the case where cryptoprocessor 24 detects that an unauthorized access attempt is occurring, it switches to a deactivation mode in which it interrupts the operation of reader 10 and deletes the critical data.

The reader components, among which cryptoprocessor 24, are powered from a same general power supply source, for example, the mains power supply. Reader 10 may comprise a secondary power supply source, for example corresponding to a lithium cell, ensuring the power supply of cryptoprocessor 24 in the case here the general power supply source is not present. When it is powered by the secondary power supply source, cryptoprocessor 24 operates in a fail-soft mode in which it only ensures the detection of unauthorized access attempts.

The present invention provides associating an integrated circuit chip 26 with each element of reader 10 for which it is desired for an unauthorized substitution attempt to be detected. In the present example, chip 26 is attached to upper package portion 14. It is for example glued to upper package portion 14, or overmoulded on it, so that it is not possible to remove chip 26 from upper package portion 14 without interrupting the operation of chip 26.

Chip 26 is connected to cryptoprocessor 24 to enable the exchange of signals between chip 26 and cryptoprocessor 24. The power supply of chip 26 may be ensured by cryptoprocessor 24. As an example, chip 26 may be connected to cryptoprocessor 24 by a wire link 28 so that any displacement of upper package portion 14 with respect to lower package portion 16 interrupts the electric connection between chip 26 and cryptoprocessor 24. As a variation, the connection between cryptoprocessor 24 and chip 26 may be performed by any adapted means. As an example, a wireless link may be provided, for example, a capacitive link.

Chip 26 comprises a memory in which is stored a serial number N which for example corresponds to a binary signal coded over several tens of bits, for example, 32 bits. Further, a key $K_f$ is stored at the level of chip 26. Key $K_f$ for example corresponds to a binary signal coded over several tens of bits, for example, 64 bits. Key $K_f$ is stored at the level of chip 26 by any conventional method so as not to be readable by a user having access to chip 26. Serial number N and key $K_f$ are stored in chip 26 during its manufacturing and remain stored even when chip 26 is not powered.

Chip 26 is capable of receiving a signal R, called random variable hereafter, provided by cryptoprocessor 24. Random variable R is a binary signal coded over several tens of bits, for example, from 64 bits to 128 bits. Chip 26 is capable of providing cryptoprocessor 24 with a binary signal S, called chip signature hereafter. Chip signature S is obtained by the following relation:

$$S=F_1(N,R,K_f) \qquad (1)$$

where $F_1$ is an encryption function implemented by chip 26 and for example corresponds to a secure hash algorithm function (SHA). Encryption function $F_1$ may be implemented by hardware means (wiring) or by software means.

Cryptoprocessor 24 is also capable of implementing encryption function $F_1$ by hardware means (wiring) or by software means. Cryptoprocessor 24 is further capable of delivering new values of random variable R according to a random or pseudo-random process. The delivery of random variable R may be performed by hardware means (wiring) or by software means.

Reader 10 is capable of exchanging signals with an activation tool external to reader 10. The activation tool may correspond to an electronic system manipulated by an operator or to one or several computers distant from reader 10 and to which reader 10 may be connected via a communication network. A mother key $K_m$ is stored at the level of the activation tool. The activation tool is capable of implementing an encryption function $F_2$, for example, of triple DES type (DES standing for Data encryption standard). Key $K_f$ of chip 26 is defined so that it can be determined by the activation tool based on serial number N and on mother key $K_m$ by the following relation:

$$K_f=F_2(N,K_m) \qquad (2)$$

An example of a method for detecting an attempt of substitution of the part to which chip 26 is attached, that is, upper package portion 14 in the present embodiment, will now be described. The method comprises an activation phase and a normal operating phase.

Figure 3:
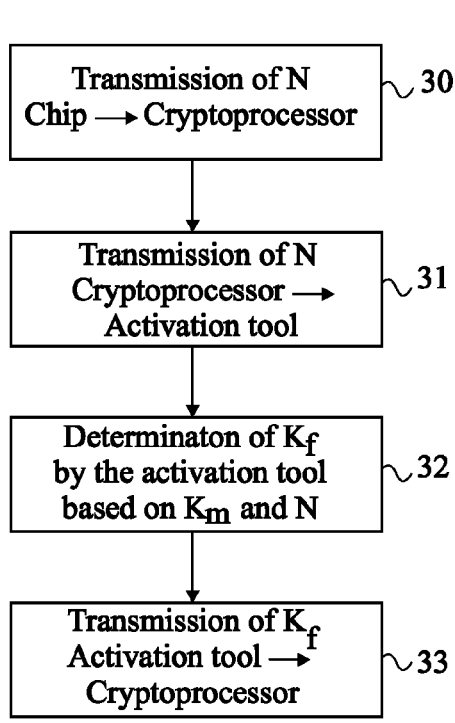
FIG. 3 shows, in the form of a block diagram, steps of an example of a method for detecting an attempt of unauthorized substitution of an original part during an activation phase.

FIG. 3 shows an example of successive steps of the activation phase which occurs for the first time that cryptoprocessor 24 is connected to chip 26. The activation phase may start with the connection of deactivated cryptoprocessor 24 to the activation tool.

At step 30, after a request from cryptoprocessor 24, chip 26 transmits serial number N to cryptoprocessor 24. Serial number N is then stored at the level of cryptoprocessor 24. The method carries on at step 31.

At step 31, cryptoprocessor 24 provides serial number N to the activation tool. The method carries on at step 32.

At step 32, the activation tool determines key $K_f$ associated with chip 26 based on previously-discussed relation (2). The method carries on at step 33.

At step 33, the activation tool provides key $K_f$ to cryptoprocessor 24. Key $K_f$ is then stored at the level of cryptoprocessor 24. Key $K_f$ is one of the critical data which are deleted when cryptoprocessor 24 detects an attempt of unauthorized access to reader 10.

Figure 4:
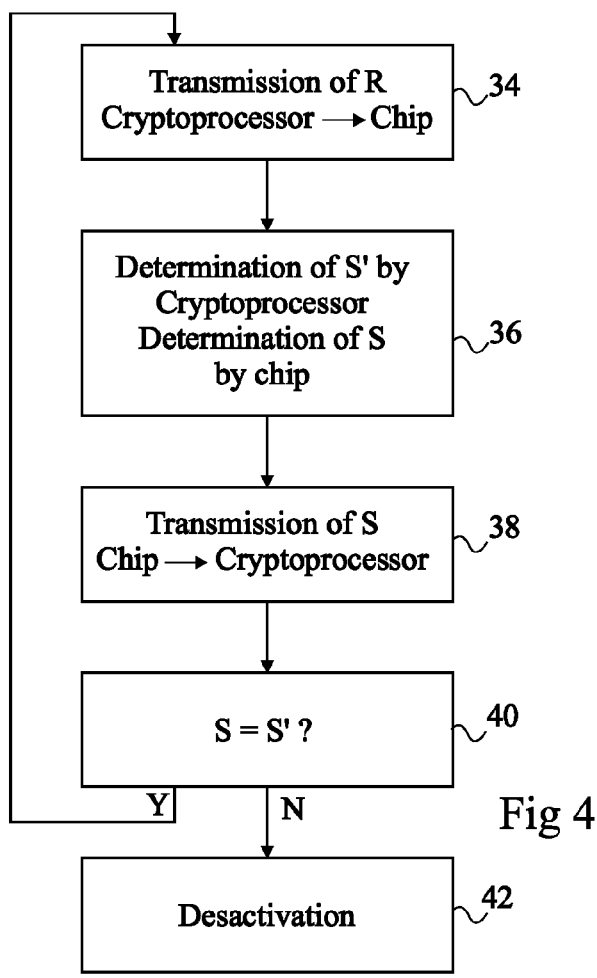
FIG. 4 shows, in the form of a block diagram, successive steps of the detection method during a normal operating phase.

FIG. 4 shows an example of successive steps of the normal operating phase of the substitution detection method. The normal operating phase is implemented identically whether cryptoprocessor 24 is powered by the general power supply source of reader 10 or by the secondary supply source. In the normal operating phase, signals are cyclically exchanged between cryptoprocessor 24 and reader 26 as long as cryptoprocessor 24 detects no unauthorized substitution attempt.

At step 34, cryptoprocessor 24 determines a new random or pseudo-random value of random variable R. Signal R is provided to chip 26 over link 28. The method carries on at step 36. As an example, cryptoprocessor 24 may be rated by a clock signal at 100 kHz. The new values of random variable R can be transmitted by cryptoprocessor 24 at a frequency ranging from 1 to 10 Hz, the bits of random variable R being then provided at a frequency ranging from 1 to 10 kHz.

At step 36, cryptoprocessor 24 determines a signal S', called cryptoprocessor signature, which corresponds to a binary signal coded over several tens of bits and which is determined based on serial number N, on key $K_f$, and on random variable R according to the following relation:

$$S'=F_1(N,K_f,R) \qquad (3)$$

At the same time, chip 26 determines chip signature S according to previously-discussed relation (1). The method carries on at step 38.

At step 38, chip 26 provides chip signature S to cryptoprocessor 24 over wire link 28. The method carries on at step 40.

At step 40, cryptoprocessor 24 compares signatures S and S'. In the case where chip signature S is equal to cryptoprocessor signature S', this means that upper package portion 14 to which chip 26 is linked is authentic. The process then restarts at step 34 by the determination of a new value of random variable R by cryptoprocessor 24.

If at step 40, cryptoprocessor 24 determines that chip signature S is different from cryptoprocessor signature S', the method carries on at step 42.

At step 42, cryptoprocessor 24 has detected that an unauthorized substitution attempt has occurred. It then switches, as on detection of an unauthorized access attempt, to a deactivation mode in which it interrupts the operation of reader 10. Further, all the critical data are deleted. Thereby, key $K_f$ stored at the level of cryptoprocessor 24 in the activation phase is deleted. The stopping of the deactivation mode of cryptoprocessor 24 and the resuming of a normal operation requires an intervention of an authorized operator and starts by a new activation phase with the activation tool having key $K_m$.

At step 40, a difference between signatures S and S' may have different causes. According to a first example, the lack of transmission of signature S by chip 26 causes the detection of a substitution attempt by cryptoprocessor 24. Such is the case, for example, when link 28 between chip 26 and cryptoprocessor 24 is interrupted. Chip 26 then behaves as a conventional safety device. According to a second example, a difference between signatures S and S' may be due to the replacing of upper package portion 14 with an upper package portion originating from another reader. In this case, the serial number of the chip of the substituted upper package portion being different from the serial number of the original upper package portion, key $K_f$ of the chip is different from key $K_f$ of cryptoprocessor 24 so that signature S provided by the chip of the substituted package portion is different from signature S' determined by cryptoprocessor 24.

Advantageously, encryption function $F_1$ implemented at the level of cryptoprocessor 24 and of chip 26 may be implemented by hardware means (by wiring). Signatures S and S' can be determined with a small number of clock cycles and for a low consumption. This is advantageous in the case where cryptoprocessor 24 is only powered by the secondary power supply source. Further, advantageously, since random variable R transmitted by cryptoprocessor 24 to chip 26 is a random or pseudo-random signal, the sequence of signals exchanged between cryptoprocessor 24 and chip 26 cannot be known in advance by a third party which would have access to the signals.

As a variation, the link between cryptoprocessor 24 and chip 26 may be any type of long-haul link. It for example is a long-haul link via an antenna implementing a radio frequency identification protocol (RFID). It is however desirable for the link between chip 26 and cryptoprocessor 24 to be interrupted as soon as upper package portion 14, to which chip 26 is attached, is displaced with respect to lower package portion 16. It is thus necessary to provide a radio frequency link of limited range while ensuring the proper transmission of signals between chip 26 and cryptoprocessor 24 in normal operation.

Specific embodiments of the present invention have been described. Various alterations and modifications will occur to those skilled in the art. In particular, although the present invention has been described in the case where chip 26 is attached to upper package portion 14 and cryptoprocessor 24 is attached to lower package portion 16, chip 26 and cryptoprocessor 24 may be attached to other elements of reader 10. In particular, chip 26 may be attached to a membrane forming keyboard 20.

The invention claimed is:

1. A card reader comprising a package formed of at least one first package portion connected to a second package portion, a display screen, a keyboard having keys, the first package portion comprising openings for the display screens and the keys, the package containing a printed circuit attached to the second package portion and a device for detecting substitution of the first package portion, said device comprising:
   a first integrated circuit attached to the first package portion; and
   a second integrated circuit attached to the printed circuit and operative to transmit to the first integrated circuit successive random or pseudo-random digital signals, the first integrated circuit operative to send back to the second integrated circuit, for each digital signal, a first signature encrypted based on said digital signal, the second integrated circuit operative to determine a second signature encrypted based on said digital signal and to detect a substitution of the first package portion if the first and second encrypted signatures are different.

2. The card reader of claim 1, wherein the first integrated circuit comprises a first memory in which are stored an identification number and a first key and the second integrated circuit comprises a second memory in which is stored a second key, the first integrated circuit operative to transmit the identification number to the second integrated circuit, the second integrated circuit operative to transmit the identification number to an activation tool external to the card reader and to receive the second key, equal to the first key, determined by the activation tool by a first encryption function based on the identification number and on a third key, the first integrated circuit operative to determine, for each digital signal, the first signature encrypted by a second encryption function based on said digital signal and on the first key, the second integrated circuit operative to determine the second signature encrypted by the second encryption function based on said digital signal and on the second key.

3. The card reader of claim 1, wherein the first integrated circuit is connected to the second integrated circuit by a wire link.

4. The card reader of claim 1, wherein the first integrated circuit is connected to the second integrated circuit by a capacitive link.

5. The card reader of claim 1, wherein the first integrated circuit is connected to the second integrated circuit by a long-haul link.

6. A method for detecting substitution of a first package portion of a card reader, the card reader further comprising a second package portion connected to the first package portion, the first package portion and the second package portion forming a package, the card reader further comprising a display screen, a keyboard having keys, the first package portion comprising openings for the display screens and the keys, the package containing a printed circuit attached to the second package portion, the method comprising:
   providing a first integrated circuit attached to the first package portion and a second integrated circuit attached to the printed circuit;
   having the second integrated circuit transmit to the first integrated circuit successive random or pseudo-random signals;
   having the first integrated circuit send back to the second integrated circuit, for each digital signal, a first signature encrypted based on said digital signal; and
   having the second integrated circuit determine a second signature encrypted based on said digital signal and detect a substitution of the first package portion if the first and second encrypted signatures are different.

7. The detection method of claim 6, comprising the steps of:
   a) storing in the first integrated circuit an identification number and a first key which is not accessible from the outside of the first integrated circuit;
   b) having, in the activation phase, the first integrated circuit transmit the identification number to the second integrated circuit;
   c) having, in the activation phase, the second integrated circuit transmit the identification number to an activation tool external to the card reader;
   d) having, in the activation phase, the activation tool determine a second key, equal to the first key, by a first encryption function based on the identification number and on a third key;
   e) having, in the activation phase, the activation tool transmit the second key to the second integrated circuit;
   f) having, in a normal operating phase, the second integrated circuit transmit to the first integrated circuit the successive random or pseudo-random digital signals;
   g) having, in the normal operating phase, the first integrated circuit send back to the second integrated circuit, for each digital signal, the first encrypted signature determined by a second encryption function based on said digital signal and on the first key; and
   h) having, in the normal operating phase, the second integrated circuit determine the second signature encrypted by the second encryption function based on said digital signal and on the second key, and detect a substitution of the first package portion if the first and second encrypted signatures are different.

8. The method of claim 7, further comprising the step of having the second integrated circuit delete the second key in the case where the first and second encrypted signatures are different at step h), reuse of the card reader then requiring a new implementation of steps b) to e).

9. The method of claim 7, wherein the first encryption function is a function of DES or Triple DES type and/or the second encryption function is a function of SHA type.

* * * * *